(12) United States Patent
Yoto

(10) Patent No.: US 10,001,195 B2
(45) Date of Patent: Jun. 19, 2018

(54) GEAR TRANSMISSION

(71) Applicant: NABTESCO CORPORATION, Tokyo (JP)

(72) Inventor: Kaoru Yoto, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days. days.

(21) Appl. No.: 15/104,827

(22) PCT Filed: Dec. 12, 2014

(86) PCT No.: PCT/JP2014/083057
§ 371 (c)(1),
(2) Date: Jun. 15, 2016

(87) PCT Pub. No.: WO2015/093419
PCT Pub. Date: Jun. 25, 2015

(65) Prior Publication Data
US 2016/0319907 A1 Nov. 3, 2016

(30) Foreign Application Priority Data

Dec. 16, 2013 (JP) .................................. 2013-259268

(51) Int. Cl.
*F16H 1/32* (2006.01)

(52) U.S. Cl.
CPC ......... *F16H 1/32* (2013.01); *F16H 2001/323* (2013.01)

(58) Field of Classification Search
CPC ......... F16H 1/32; F16H 2001/323; F16H 3/70
See application file for complete search history.

(56) References Cited

U.S. PATENT DOCUMENTS

| 5,322,485 A | 6/1994 | Haga |
| 5,472,384 A | 12/1995 | Haga |

(Continued)

FOREIGN PATENT DOCUMENTS

| CN | 101939562 A | 1/2011 |
| JP | H05-180278 A | 7/1993 |

(Continued)

OTHER PUBLICATIONS

International Search Report as issued in International Patent Application No. PCT/JP2014/083057, dated Mar. 17, 2015.

(Continued)

*Primary Examiner* — Huan Le
(74) *Attorney, Agent, or Firm* — Pillsbury Winthrop Shaw Pittman, LLP

(57) ABSTRACT

A gear transmission includes a crankshaft, an eccentric rotation gear and a rotation gear. The eccentric rotation gear is configured to rotate eccentrically with a rotation of the crankshaft. The rotation gear meshes with the eccentric rotation gear. The crankshaft includes a shaft portion, a first eccentric portion and a second eccentric portion. The first eccentric portion engages with the eccentric rotation gear. The second eccentric portion is disposed between the shaft portion and the first eccentric portion. A rotation axis of the first eccentric portion is offset with a first distance from a rotation axis of the shaft portion. A rotation axis of the second eccentric portion is offset with a second distance from the rotation axis of the shaft portion. The second distance is shorter than the first distance.

7 Claims, 3 Drawing Sheets

(56) References Cited

U.S. PATENT DOCUMENTS 5,701,671 A    12/1997  Haga
2010/0292040 A1   11/2010  Yamamoto et al.

FOREIGN PATENT DOCUMENTS

| JP | 2002-310162 A | | 10/2002 | |
|---|---|---|---|---|
| JP | 2009-197819 A | | 9/2009 | |
| JP | 2009-287725 A | | 12/2009 | |
| JP | 2010-127343 A | | 6/2010 | |
| JP | 2011-163416 A | | 8/2011 | |
| JP | 2011163416 A | * | 8/2011 | ............... F16H 1/32 |

OTHER PUBLICATIONS

Written Opinion of the International Searching Authority as issued in International Patent Application No. PCT/JP2014/083057, dated Mar. 17, 2015.
Notification of Reasons for Rejection as issued in Japanese Patent Application No. 2013-259268, dated Apr. 11, 2017.
International Preliminary Report on Patentability and the Written Opinion of the International Searching Authority as issued in International Patent Application No. PCT/JP2014/083057, dated Jun. 30, 2016.
Office Action Chinese Patent Application No. 201480068761.9 dated Nov. 1, 2017 with partial English translation.

* cited by examiner

GEAR TRANSMISSION

TECHNICAL FIELD

This application is the U.S. National Stage of PCT/JP2014/083057, filed Dec. 12, 2014, which in turn claims priority to Japanese Patent Application No. 2013-259268, filed on Dec. 16, 2013, the entire contents of which are hereby incorporated by reference into the present application. The present specification discloses a technique related to a gear transmission.

BACKGROUND ART

A gear transmission is known that comprises an eccentric rotation gear configured to rotate eccentrically, and a rotation gear meshing with the eccentric rotation gear and comprising a different number of teeth from a number of teeth of the eccentric rotation gear. In this type of gear transmission, the eccentric rotation gear is rotated eccentrically by using a crankshaft. A through hole is provided in the eccentric rotation gear, and an eccentric portion is provided on the crankshaft. The eccentric portion is disposed in the through hole of the eccentric rotation gear. A bearing (called first bearing below) is disposed between the eccentric portion and the through hole. In a gear transmission of Japanese Patent Application Publication No. H5-180278 (1993), a washer is attached to a shaft portion of the crankshaft, regulating movement of the first bearing in an axial direction of the first bearing.

SUMMARY OF INVENTION

In the gear transmission of Japanese Patent Application Publication No. H5-180278 (1993), the washer is attached to the shaft portion of the crankshaft. That is, the washer is attached to the shaft portion coaxially, and is not attached to the eccentric portion coaxially. Therefore, when the crankshaft is viewed along an axial direction, a length with which the washer protrudes to outside the eccentric portion is different depending on a position in a circumferential direction of the eccentric portion. It is necessary to position an outer periphery of the washer outside of an outer periphery of the eccentric portion in order to regulate movement of the first bearing in the axial direction (i.e. axial movement of the first bearing). Since the washer and the eccentric portion are not coaxial, it is necessary to increase an outer diameter of the washer in order to position the outer periphery of the washer outside of the outer periphery of the eccentric portion. However, when the outer diameter of the washer is increased, it is possible that a part of the washer may protrude over to outside of an outer periphery of the first bearing, and consequently the washer may interfere with another component. Conversely, when the outer diameter of the washer is adjusted so that the washer does not protrude over to the outside of the outer periphery of the first bearing, an extent of the washer not protruding to the outside of the outer periphery of the eccentric portion becomes wider. As a result, it is possible that the washer may become unable to regulate the movement of the first bearing. The present specification aims to solve the above problem, and discloses a technique of more reliably regulating the movement of the first bearing in the axial direction.

A gear transmission disclosed in the present specification comprises a crankshaft, an eccentric rotation gear, and a rotation gear. The eccentric rotation gear is configured to rotate eccentrically with a rotation of the crankshaft. The rotation gear meshes with the eccentric rotation gear and comprises a different number of teeth from a number of teeth of the eccentric rotation gear. The crankshaft comprises a shaft portion, a first eccentric portion, and a second eccentric portion. The first eccentric portion is disposed at a middle of the shaft portion, and engages with the eccentric rotation gear. The second eccentric portion is disposed between the shaft portion and the first eccentric portion. In the gear transmission disclosed in the present specification, a first rotation axis of the first eccentric portion is offset with a first distance from a rotation axis of the shaft portion, and a second rotation axis of the second eccentric portion is offset with a second distance from the rotation axis of the shaft portion, and the second distance is shorter than the first distance.

According to the aforementioned gear transmission, by attaching a washer to the second eccentric portion, it is possible to offset the washer from both the rotation axis of the shaft portion and the rotation axis (first rotation axis) of the first eccentric portion. More specifically, the washer can be attached to the crankshaft with an amount of eccentricity smaller than an amount of eccentricity of the first eccentric portion relative to the shaft portion. Compared to a case in which the washer is attached to the shaft portion, it is possible to ensure a wide extent of the washer protruding over to an outside of an outer periphery of the first eccentric portion, while maintaining a small size (outer diameter) of the washer.

Moreover, if the second eccentric portion is offset by the same amount as the first eccentric portion from the rotation axis of the shaft portion (if the second distance is made equal to the first distance), a length with which the washer protrudes to the outside of the outer periphery of the first eccentric portion becomes equal in a circumferential direction of the first eccentric portion. Therefore, it can be expected that the size of the washer is further reduced. However, if the second distance is equal to the first distance (the second eccentric portion is coaxial with the first eccentric portion), the amount of eccentricity of the washer relative to the shaft portion increases. As a result, it is possible that a component which is to regulate movement of the washer (to retain the washer at the second eccentric portion) may not make contact with the washer. When the washer moves in the axial direction, as a result, it is not possible for the washer to regulate the axial movement of the first bearing. By making the second distance shorter than the first distance, the aforementioned gear transmission can more reliably regulate the axial movement of the first bearing.

DESCRIPTION OF EMBODIMENTS

Figure 1:
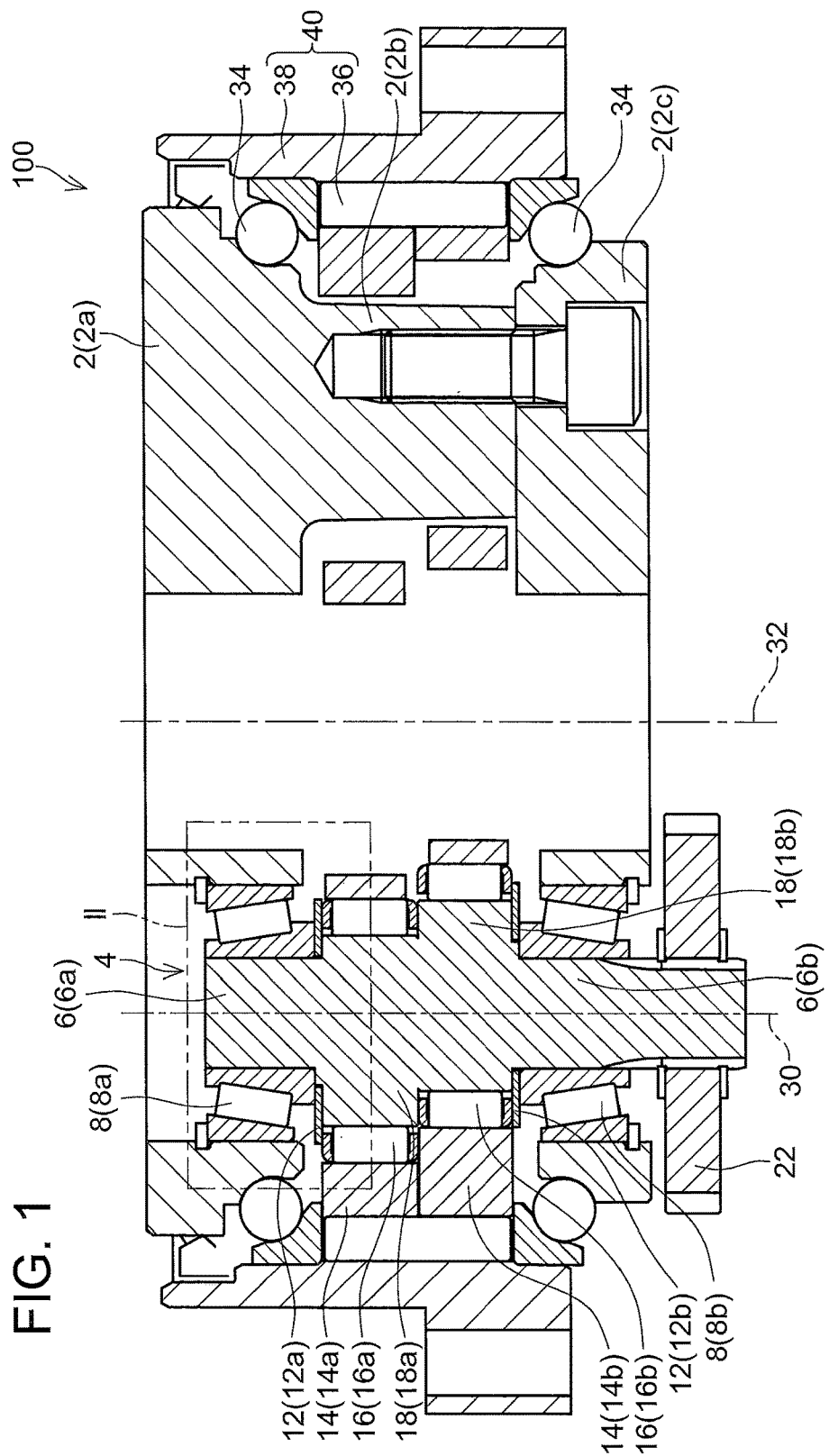
FIG. 1 shows a cross-sectional view of a gear transmission of the embodiment.

Some of the features characteristic to the gear transmission disclosed will herein be listed. It should be noted that the respective technical elements are independent of one another. Moreover, each of the features described below has technical utility alone.

A gear transmission comprises a crankshaft, an eccentric rotation gear and a rotation gear. The eccentric rotation gear may rotate eccentrically with a rotation of the crankshaft. The rotation gear may mesh with the eccentric rotation gear, and may comprise a different number of teeth from a number of teeth of the eccentric rotation gear. The eccentric rotation gear may be an external gear, and the rotation gear may be an internal gear. Alternatively, the eccentric rotation gear may be an internal gear, and the rotation gear may be an external gear. In a case where the eccentric rotation gear is an external gear, the eccentric rotation gear may comprise a carrier which rotates relatively to the internal gear. A case surrounding an outside of the external gear in a radial direction may also serve as the internal gear. In this case, the crankshaft may be rotatably supported by the carrier. A shaft portion of the crankshaft may be supported by the carrier via a bearing. In a case where the eccentric rotation gear is an internal gear, the eccentric rotation gear may comprise a case surrounding an outside of the internal gear in a radial direction. In this case, the crankshaft may be rotatably supported by the case. The shaft portion of the crankshaft may be supported by the case via a bearing.

The crankshaft may comprise a shaft portion, a first eccentric portion and a second eccentric portion. The first eccentric portion may be disposed at a middle of the shaft portion. In other words, the shaft portion may extend from the first eccentric portion in both orientations of the axial direction of the crankshaft. The first eccentric portion may engage with the eccentric rotation gear. A through hole may be provided in the eccentric rotation gear, and the first eccentric portion may engage with the through hole via a bearing (first bearing). That is, the first bearing may be disposed between the first eccentric portion and the eccentric rotation gear. The first bearing may be a cylindrical roller bearing. A first rotation axis of the first eccentric portion may be offset with a first distance from a rotation axis of the shaft portion. The first rotation axis may extend parallel to the rotation axis of the shaft portion. When the crankshaft rotates, the first rotation axis rotates about the rotation axis of the shaft portion.

The second eccentric portion may be disposed between the shaft portion and the first eccentric portion. A second rotation axis of the second eccentric portion may be offset with a second distance from the rotation axis of the shaft portion. The second distance may be different from the first distance. Further, the second distance may be shorter than the first distance. The second rotation axis may extend parallel to the rotation axis of the shaft portion. When the crankshaft rotates, the second rotation axis rotates about the rotation axis of the shaft portion. The second rotation axis may be disposed between the rotation axis of the shaft portion and the first rotation axis. That is, when the crankshaft is viewed along an axial direction of the crankshaft, the rotation axis of the shaft portion, the first rotation axis and the second rotation axis may be aligned on a single straight line. In other words, an eccentric direction of the second eccentric portion relative to the shaft portion may be same as an eccentric direction of the first eccentric portion relative to the shaft portion.

A diameter of the second eccentric portion may be larger than a diameter of the shaft portion, and smaller than a diameter of the first eccentric portion. Further, when the crankshaft is viewed along the axial direction, an outer periphery of the first eccentric portion may be located outside of an outer periphery of the second eccentric portion. Further, when the crankshaft is viewed along the axial direction, the outer periphery of the second eccentric portion may be located outside of an outer periphery of the shaft portion. A part of the outer periphery of the second eccentric portion may be disposed outside of the outer periphery of the shaft portion, and another part of the outer periphery of the second eccentric portion may overlap with the outer periphery of the shaft portion. Moreover, in the description below, "viewing the crankshaft along the axial direction" may be called "plan view".

A ring member may be attached to the second eccentric portion. In a plan view of the crankshaft, an outer periphery of the ring member may be located outside of the outer periphery of the first eccentric portion. In this case, an entirety of the outer periphery of the ring member may be disposed outside of the outer periphery of the first eccentric portion, or a part of the outer periphery of the ring member may be disposed outside of the outer periphery of the first eccentric portion. Further, in the plan view, the ring member may overlap with the first bearing. In this case, the ring member may overlap with the first bearing in an entire circumferential direction of the ring member, or the ring member may overlap with the first bearing in a part of the circumferential direction of the ring member.

A second bearing comprising an inner race, rolling elements and an outer race may be attached to the shaft portion. The crankshaft may be supported by the carrier or the case via the second bearing. The second bearing may be a type of bearing that regulates movement of the crankshaft in an axial direction and a radial direction of the crankshaft. Moreover, a tapered roller bearing, angular contact roller bearing, angular contact ball bearing, etc. can be used as this type of bearing. In a plan view, an outer periphery of the inner race of the second bearing may be located outside of an outer periphery of the second eccentric portion. In this case, the inner race of the second bearing may be located outside of the outer periphery of the second eccentric portion in an entire circumferential direction of the inner race, or the inner race of the second bearing may be located outside of the outer periphery of the second eccentric portion in a part of the circumferential direction of the inner race. Further, the inner race of the second bearing may be in contact with the ring member.

Embodiment

A gear transmission 100 will be described with reference to FIG. 1. Moreover, in the following description, components having essentially a same function may be described by omitting alphabetical letters appended to the reference numbers. The gear transmission 100 comprises an internal gear 40, a carrier 2, a crankshaft 4, and external gears 14. The internal gear 40 is an example of a rotation gear, and the external gears 14 are an example of an eccentric rotation gear. The internal gear 40 comprises a case 38 and a plurality of inner teeth pins 36. The case 38 surrounds an outside of the external gears 14 in its radial direction. The inner teeth pins 36 each have a cylindrical shape, and are disposed at an inner peripheral surface of the case 38. The carrier 2 is supported rotatably by the case 38 with a pair of bearings 34. The pair of bearings 34 regulates axial and radial movement of the carrier 2 relative to the case 38. In the gear transmission 100, angular contact ball bearings are used as the pair of bearings 34. The inner teeth pins 36 are disposed between the pair of bearings 34.

The carrier 2 comprises a first plate 2a and a second plate 2c. The first plate 2a comprises a columnar portion 2b. The columnar portion 2b extends from the first plate 2a toward the second plate 2c, and is fixed to the second plate 2c. The crankshaft 4 is supported rotatably by the carrier 2 with a pair of bearings 8 (8a, 8b). The bearing 8a is attached to the first plate 2a, and the bearing 8b is attached to the second plate 2c. The pair of bearings 8 regulates axial and radial movement of the crankshaft 4 relative to the carrier 2. In the gear transmission 100, angular contact roller bearings are used as the pair of bearings 8. The pair of bearings 8 is an example of a second bearing. The pair of bearings 8 may be referred to as second bearings 8 (8a, 8b) below. Details of the second bearings 8 will be described later.

The crankshaft 4 comprises two first eccentric portions 18 (18a, 18b). The first eccentric portions 18 are disposed at a middle of a shaft portion 6 (6a, 6b). The shaft portion 6 is supported by the carrier 2 with the pair of second bearings 8. The first eccentric portion 18a engages with the external gear 14a via a bearing 16a. The first eccentric portion 18b engages with the external gear 14b via a bearing 16b. In the gear transmission 100, cylindrical roller bearings are used as the bearings 16 (16a, 16b). The bearings 16 are an example of the first bearing. In the description below, the bearings 16 may be referred to as first bearings 16 (16a, 16b). An axial movement of the first bearing 16a is regulated by a washer 12a and the first eccentric portion 18b. The washer 12a is an example of a ring member. An axial movement of the first bearing 16b is regulated by a washer 12b and the first eccentric portion 18a. Details of the first bearings 16 will be described later.

An input gear 22 is fixed to the shaft portion 6b. The input gear 22 is fixed to the shaft portion 6b outside of the pair of second bearings 8. Torque from a motor (not shown) is transmitted to the input gear 22. When the torque from the motor is transmitted to the input gear 22, the crankshaft 4 rotates about a rotation axis 30. When the crankshaft 4 rotates, the first eccentric portions 18 rotate eccentrically about the rotation axis 30. In accordance with the eccentric rotation of the first eccentric portions 18, the external gears 14 rotate eccentrically while meshing with the internal gear 40. The external gears 14 rotate eccentrically about an axis shaft 32 of the gear transmission 100. The first eccentric portion 18a and the first eccentric portion 18b are eccentric symmetrically with respect to the rotation axis 30. Therefore, the external gear 14a and the external gear 14b rotate eccentrically symmetrically about the axis shaft 32.

The crankshaft 4 will be described in detail with reference to FIG. 2. Moreover, in the description below, a configuration of surroundings of the shaft portion 6a and the first eccentric portion 18a will be described. Since a configuration of surroundings of the shaft portion 6b and the first eccentric portion 18b is substantially the same as the configuration of the surroundings of the shaft portion 6a and the first eccentric portion 18a, a description thereof will be omitted.

Figure 2:
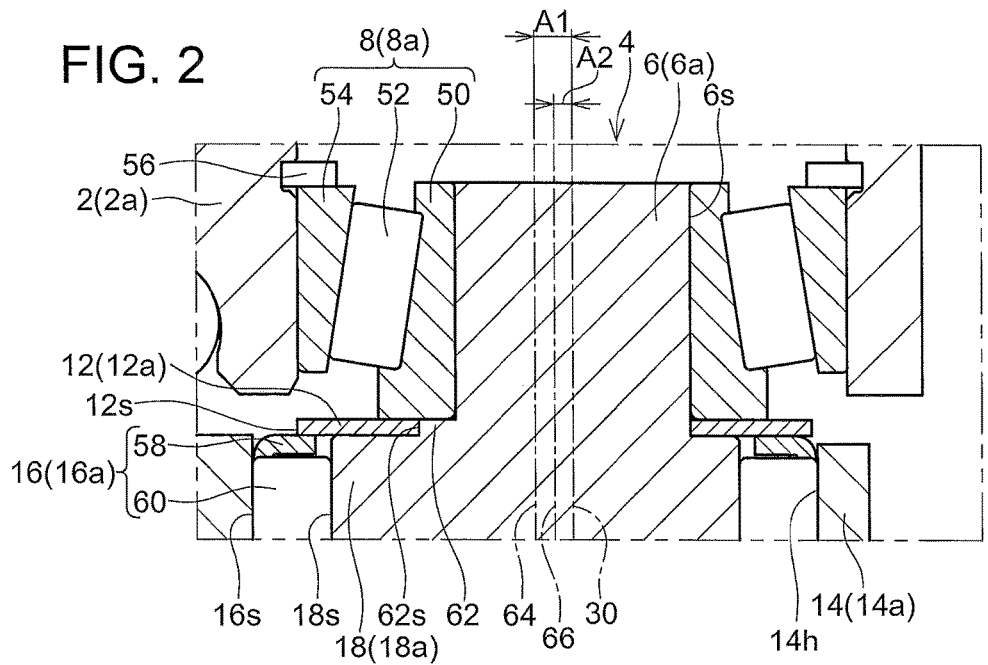
FIG. 2 shows an enlarged cross-sectional view of a portion surrounded by a broken line II of FIG. 1.

As shown in FIG. 2, the crankshaft 4 has the shaft portion 6a, the first eccentric portion 18 and a second eccentric portion 62. A rotation axis 64 of the first eccentric portion 18 is offset with a distance A1 (first distance) from the rotation axis 30 of the shaft portion 6. A rotation axis 66 of the second eccentric portion 62 is offset with a distance A2 (second distance) from the rotation axis 30 of the shaft portion 6. An offset amount (distance A2) of the rotation axis 66 relative to the rotation axis 30 is shorter than an offset amount (distance A1) of the rotation axis 64 relative to the rotation axis 30. The second eccentric portion 62 is disposed between the shaft portion 6a and the first eccentric portion 18 in the axial direction (the direction in which the rotation axis 30 extends). The first eccentric portion 18 is disposed in a through hole 14h of the external gear 14. The first bearing 16 is attached to the first eccentric portion 18. The first bearing 16 fits with an outer periphery of the first eccentric portion 18. The first eccentric portion 18 engages with the external gear 14 via the first bearing 16. The first bearing 16 comprises a retainer 58 and a plurality of cylindrical rollers 60.

The second bearing 8 is disposed between the shaft portion 6 and the carrier 2. The second bearing 8 comprises an inner race 50, rolling elements (cylindrical rollers) 52, and an outer race 54. The inner race 50 is attached to the shaft portion 6a. Specifically, the inner race 50 fits with an outer periphery 6s of the shaft portion 6a. The outer race 54 is attached to the carrier 2. A stopper 56 is attached to the carrier 2, and is in contact with the outer race 54 of the second bearing 8a. The stopper 56 regulates outward movement of the outer race 54 in the rotation axis 30 direction (movement to the opposite side to a side where the first eccentric portion 18 is present).

The rolling elements 52 are disposed between the inner race 50 and the outer race 54. A rotation axis of the rolling elements 52 is inclined relative to the rotation axis 30 of the shaft portion 6. More specifically, the rotation axis of the rolling elements 52 is inclined from an inside (the side at which the first eccentric portion 18 is present) of the rotation axis 30, in the direction of the rotation axis 30 of the crankshaft 4, toward an outside thereof, so as to approach the rotation axis 30. A pair of second bearings 8a and 8b imparts preload compressing the crankshaft 4 in the direction of the rotation axis 30 (see also FIG. 1). The second bearings 8 regulate axial and radial movement of the crankshaft 4.

The washer 12a is attached to an outer periphery 62s of the second eccentric portion 62. A thickness of the washer 12 is approximately equal to a thickness of the second eccentric portion 62. The washer 12 is disposed between the first eccentric portion 18 and the inner race 50. An axial movement of the washer 12 is regulated by the first eccentric portion 18 and the inner race 50. An outer diameter of the washer 12a is larger than an outer diameter of the first eccentric portion 18. Further, when the crankshaft 4 is viewed along the direction of the rotation axis 30, an entirety of an outer periphery 12s of the washer 12 is disposed outside of an outer periphery 18s of the first eccentric portion 18. Further, the entirety of the outer periphery 12s of the washer 12 is disposed inside of an outer periphery 16s of the first bearing 16.

Figure 3:
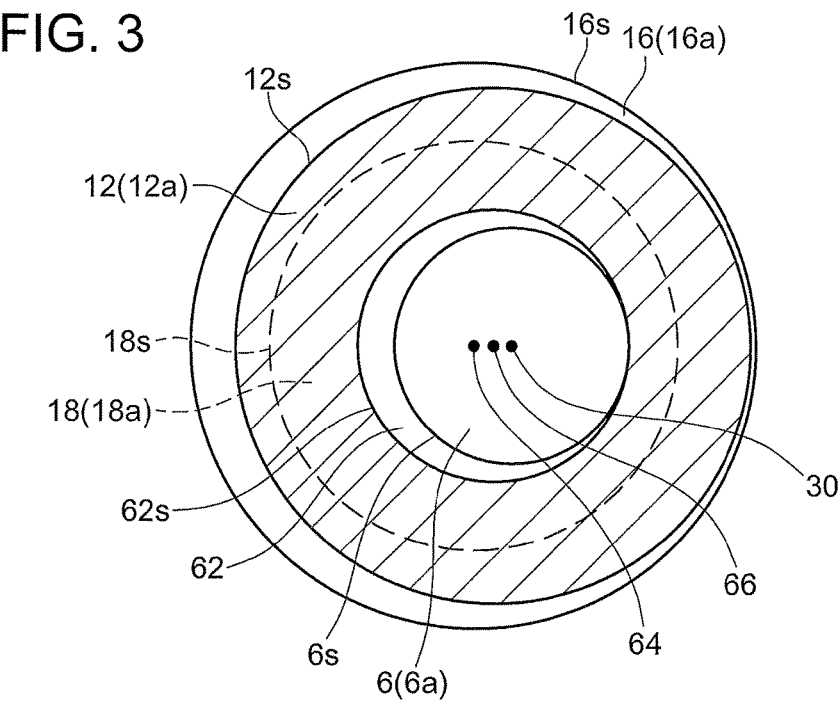
FIG. 3 shows a diagram for explaining characteristics of the gear transmission of the embodiment.

FIG. 3 is a diagram showing positions of the shaft portion 6, the first eccentric portion 18, the second eccentric portion 62, the first bearing 16 and the washer 12, when the crankshaft 4 is viewed along the direction of the rotation axis 30 (plan view). Moreover, a detailed illustration of the first bearing 16 is omitted, and only its existing range is shown. As is clear from FIGS. 2 and 3, the rotation axes 64 and 66 extend parallel to the rotation axis 30. Further, the rotation axis 66 is disposed on a straight line connecting the rotation axis 30 and the rotation axis 64 (FIG. 3). That is, the first eccentric portion 18 and the second eccentric portion 62 have the same eccentric direction relative to the shaft portion 6, and an amount of eccentricity of the second eccentric portion 62 relative to the shaft portion 6 is smaller than an amount of eccentricity of the first eccentric portion 18 relative to the shaft portion 6.

As shown in FIG. 3, the outer periphery 12s of the washer 12 is located, along the entire periphery, outside of the outer periphery 18s of the first eccentric portion 18. The washer 12 overlaps with the first bearing 16 along the entire periphery. Specifically, the washer 12 overlaps with the retainer 58 of the first bearing 16 along its entire circumferential direction (see also FIG. 2). The washer 12 makes contact with the first bearing 16 (the retainer 58) in its entire circumferential direction, and can regulate an axial movement of the first bearing 16. Further, the outer periphery 12s of the washer 12 is located inside of the outer periphery 16s of the first bearing 16. That is, in a plan view, the washer 12 does not overlap with (does not interfere with) the external gear 14.

An outer diameter of the second eccentric portion 62 is larger than an outer diameter of the shaft portion 6. Further, almost the entire outer periphery 62s of the second eccentric portion 62 is located outside of the outer periphery 6s of the shaft portion 6. In other words, in a plan view, a part of the outer periphery 62s overlaps with the outer periphery 6s. The outer diameter of the second eccentric portion 62 is smaller than the outer diameter of the first eccentric portion 18. Further, an entirety of the outer periphery 62s of the second eccentric portion 62 is located inside of the outer periphery 18s of the first eccentric portion 18. Therefore, when the washer 12 is attached to the second eccentric portion 62, the washer 12 makes contact with the first eccentric portion 18 in an entire circumferential direction of the washer 12. Moreover, the inner race 50 of the second bearing 8 is located, in the entire circumferential direction, outside of the outer periphery 62s of the second eccentric portion 62. Therefore, the inner race 50 makes contact with the washer 12 in the entire circumferential direction of the inner race 50.

Operation of the gear transmission 100 will be described. When torque of a motor (not shown) is transmitted to the input gear 22, the crankshaft 4 rotates about the rotation axis 30. The first eccentric portions 18 rotate eccentrically about the rotation axis 30 in accordance with the rotation of the crankshaft 4. For example, in the case of the first eccentric portion 18a, the rotation axis 64 of the first eccentric portion 18a revolves about the rotation axis 30. In accordance with the eccentric rotation of the first eccentric portions 18, the external gears 14 rotate eccentrically about the rotation axis 32 while meshing with the internal gear 40. A number of teeth of the external gears 14 is different from a number of teeth of the internal gear 40 (the number of inner teeth pins 36). Therefore, when the external gears 14 rotate eccentrically, the carrier 2 supporting the external gears 14 rotates relative to the internal gear 40 (the case 38) in accordance with the difference in number of teeth of the external gears 14 and the internal gear 40. The rotation axis 32 is also the rotation axis of the carrier 2.

During driving of the gear transmission 100, when the first bearing 16 attempts to move in the axial direction (the direction of the rotation axis 30), the retainer 58 of the first bearing 16 makes contact with the washer 12. In such a manner, the axial movement of the first bearing 16 can be regulated during the driving of the gear transmission 100. Moreover, the inner race 50 of the second bearing 8 is in contact with the washer 12. Further, as described above, preload compressing the crankshaft 4 in the direction of the rotation axis 30 is imparted by the second bearing 8. Therefore, force is applied by the inner race 50 to the washer 12 such that the washer 12 is pressed to the first eccentric portion 18. Therefore, it is possible to regulate the axial movement of the washer 12 even if force is applied to the washer 12 from the first bearing 16.

Figure 4:
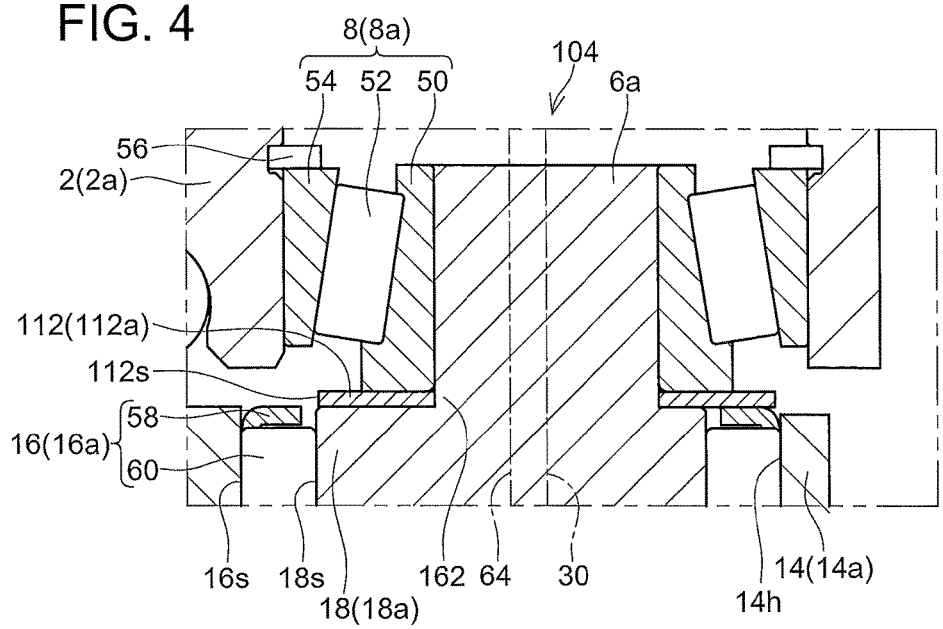
FIG. 4 shows a diagram for explaining characteristics of a conventional gear transmission.
Figure 5:
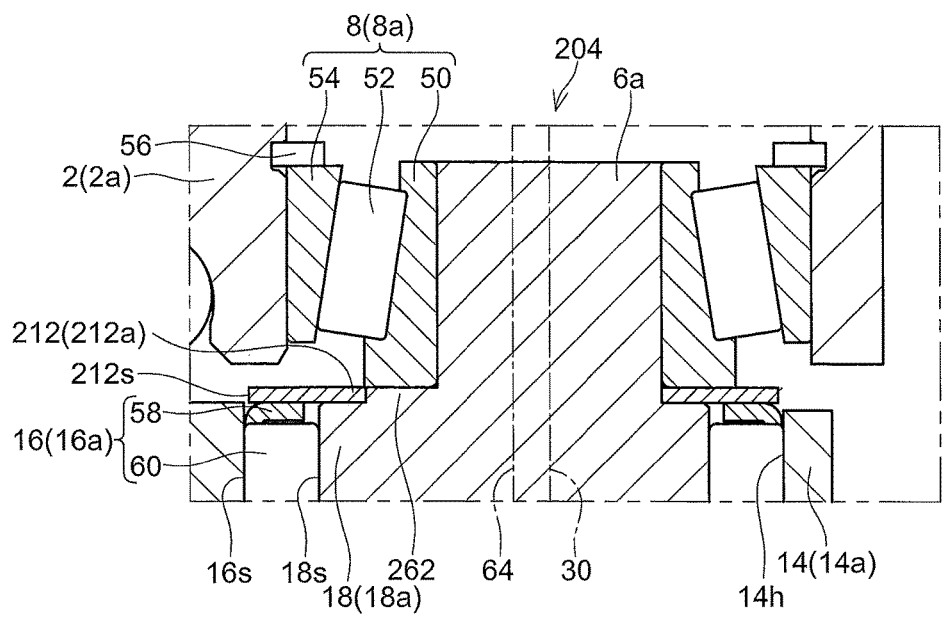
FIG. 5 shows a diagram for explaining characteristic of a gear transmission of a comparative embodiment.

Advantages of the gear transmission 100 will be described with reference to FIG. 2 to FIG. 5. Moreover, FIG. 4 and FIG. 5 show parts of crankshafts 104 and 204. FIG. 4 and FIG. 5 correspond to the range shown in FIG. 2. For the crankshafts 104 and 204, components that are substantially the same as those of the crankshaft 4 are denoted by the same reference numbers or reference numbers having the same two last digits, and the descriptions thereof may thereby be omitted.

As described above, the crankshaft 4 comprises the first eccentric portion 18 and the second eccentric portion 62. The offset amount of the rotation axis 64 of the first eccentric portion 18 from the rotation axis 30 is different from the offset amount of the rotation axis 66 of the second eccentric portion 62 from the rotation axis 30. As a result, the following advantages can be obtained: (1) it is possible to suppress interference of the washer with another component (e.g., external gear); (2) it is easy for the washer to regulate the axial movement of the first bearing; and (3) it is easy for the inner race of the second bearing to regulate the axial movement of the washer (see FIGS. 2 and 3). That is, it is possible to reliably regulate movement of the first bearings in the axial direction while suppressing interference of the washer with another component.

In the crankshaft 104 shown in FIG. 4, a rotation axis of a second eccentric portion 162 is coaxial with the rotation axis 30 of the shaft portion 6. Further, a diameter of the second eccentric portion 162 is equal to the diameter of the shaft portion 6. In other words, the crankshaft 104 is not provided with a second eccentric portion, and a washer 112 is attached to the shaft portion 6. In the case of the crankshaft 104, the first bearing 16 cannot be pressed sufficiently by the washer 112, and consequently the axial movement of the first bearing 16 cannot be regulated sufficiently. That is, the aforementioned advantage (2) cannot be obtained.

Moreover, if a diameter of the washer 112 is increased, it is possible to regulate the movement of the first bearing 16 in the axial direction. However, in that case, a part of the washer 112 is located outside of the outer periphery 16s of the first bearing 16, and it becomes difficult to obtain the aforementioned advantage (1). Further, although not shown, even if the diameter of the second eccentric portion 162 is made larger than the diameter of the shaft portion 6, only an inner diameter of the washer 112 is reduced, and the aforementioned advantage (2) cannot be obtained.

In the crankshaft 204 shown in FIG. 5, a rotation axis of a second eccentric portion 262 is coaxial with the rotation axis 30 of the shaft portion 6. In the case of the crankshaft 204, the aforementioned advantage (3) cannot be obtained. Consequently, the crankshaft 204, also, cannot sufficiently regulate movement of the first bearing 16 in the axial direction. In particular, if the amount of eccentricity of the first eccentric portion 18 (the offset amount of the rotation axis 64 relative to the rotation axis 30) increases, a diameter of the second eccentric portion 262 increases, and it becomes more difficult to obtain the aforementioned advantage (3).

In the above embodiment, the inner race 50 of the second bearing 8 is in contact with the washer 12 over its entire circumferential direction, and the washer 12 is in contact with the first bearing 16 (the retainer 58) over its entire circumferential direction. However, a part of the inner race 50 of the second bearing 8 may not be in contact with the washer 12 in a circumferential direction of the inner race 50. Further, the washer 12 may not be in contact with a part of the first bearing 16 in a circumferential direction of the first bearing 16. What is important is that two types of eccentric portions (the first eccentric portion engaging with the eccentric rotation gear, and the second eccentric portion) are provided on the crankshaft, that the second eccentric portion is disposed between the shaft portion and the first eccentric portion, and that the amount of eccentricity of the second eccentric portion relative to the rotation axis of the crankshaft is smaller than the amount of eccentricity of the first eccentric portion.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A gear transmission comprising:
   a crankshaft;
   an eccentric rotation gear configured to rotate eccentrically with a rotation of the crankshaft; and
   a rotation gear meshing with the eccentric rotation gear and comprises a different number of teeth from a number of teeth of the eccentric rotation gear,
   wherein the crankshaft comprises a shaft portion, a first eccentric portion disposed at a middle of the shaft portion and engaging with the eccentric rotation gear and a second eccentric portion disposed between the shaft portion and the first eccentric portion,
   a first rotation axis of the first eccentric portion is offset with a first distance from a rotation axis of the shaft portion,
   a second rotation axis of the second eccentric portion is offset with a second distance from the rotation axis of the shaft portion, and
   wherein the second distance is shorter than the first distance.

2. The gear transmission according to claim 1, wherein an eccentric direction of the second eccentric portion relative to the shaft portion is equal to an eccentric direction of the first eccentric portion relative to the shaft portion.

3. The gear transmission according to claim 2, wherein a ring member is attached to the second eccentric portion, and wherein, when the crankshaft is viewed along an axial direction of the crankshaft, an outer periphery of the ring member is located outside of an outer periphery of the first eccentric portion.

4. The gear transmission according to claim 3, wherein an entirety of the outer periphery of the ring member is located outside of the outer periphery of the first eccentric portion.

5. The gear transmission according to claim 4, wherein a first bearing is disposed between the first eccentric portion and the eccentric rotation gear, and wherein, when the crankshaft is viewed along the axial direction of the crankshaft, an outer edge of the ring member is within an outer edge of the first bearing.

6. The gear transmission according to claim 5, wherein a second bearing comprising an inner race, rolling elements and an outer race is attached to the shaft portion, and wherein, when the crankshaft is viewed along the axial direction of the crankshaft, an outer edge of the inner race of the second bearing is located outside of an outer periphery of the second eccentric portion.

7. The gear transmission according to claim 1, wherein a second bearing comprising an inner race, rolling elements and an outer race is attached to the shaft portion, and wherein, when the crankshaft is viewed along the axial direction of the crankshaft, an outer edge of the inner race of the second bearing is located outside of an outer periphery of the second eccentric portion.

* * * * *